Sept. 5, 1933.  E. DELAY  1,925,864
BRAKE FOR POWER VEHICLES
Filed Nov. 20, 1930   2 Sheets-Sheet 1

Inventor
Eugène Delay
by
Lorra & Kehlenbeck
Attorneys

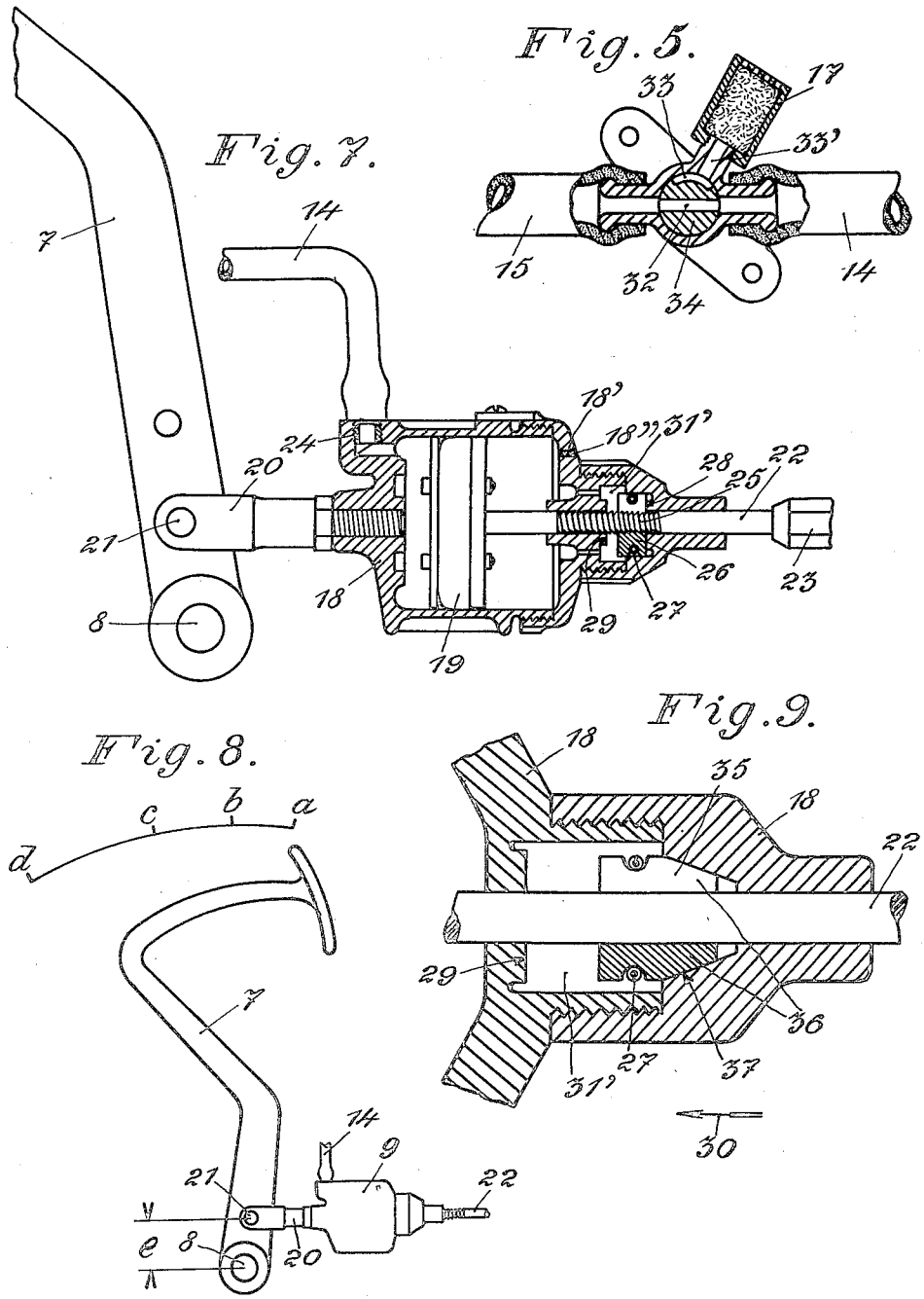

Patented Sept. 5, 1933

1,925,864

UNITED STATES PATENT OFFICE 1,925,864

BRAKE FOR POWER VEHICLES

Eugène Delay, St.-Ouen, France, assignor to Badertscher Vakuumbremse A. G., Zurich, Switzerland, a corporation Application November 20, 1930, Serial No. 496,859, and in France November 26, 1929

11 Claims. (Cl. 188—196)

My invention relates to brakes for power vehicles, and has for its object to overcome certain drawbacks found in such brakes as usually constructed. The customary mechanical brakes for motor cars have the defect of requiring periodical readjustment as the brake or rather the brake lining wears, since otherwise the braking action becomes inefficient and unreliable. Neglect to adjust the brakes may lead to serious accidents which could have been avoided by keeping the brakes in proper condition.

To overcome this defect I have devised an improved brake mechanism in which any wear of the brake or of its lining is compensated for automatically, thus dispensing with any work to be done for readjusting the brakes, and insuring, without any attention on the part of the owner or chauffeur, a condition which will guarantee that the brakes will always remain equally effective.

Figure 1:
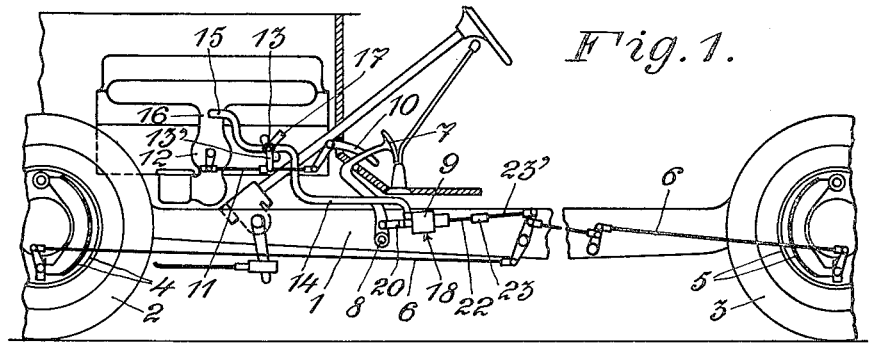
Figure 2:
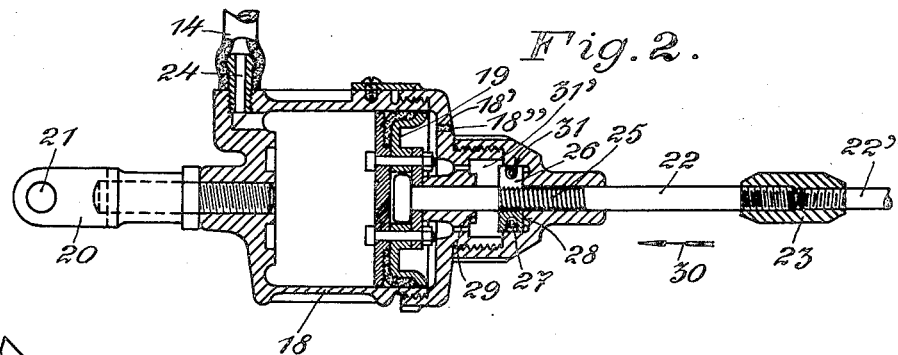
Figure 3:
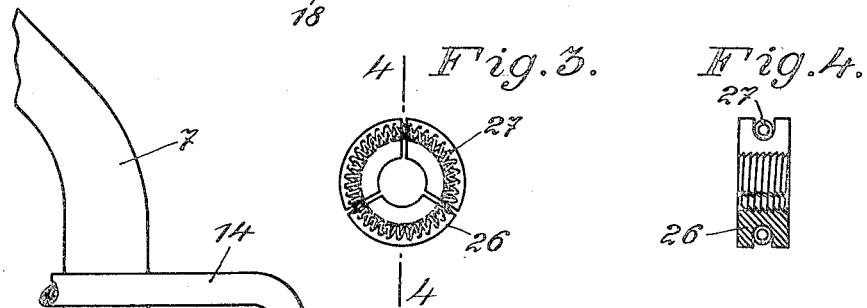
Figure 4:
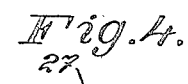
Figure 6:
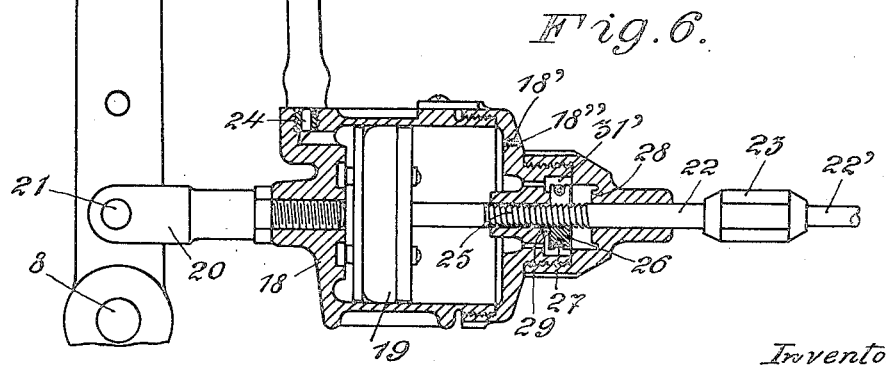

Reference is to be had to the accompanying drawings, in which Fig. 1 is a diagrammatic partial side elevation of a motor car provided with a satisfactory and typical embodiment of my improved brake mechanism; Fig. 2 is a longitudinal vertical section, upon an enlarged scale, of a controlling device interposed between the pedal or other brake-actuating member and the brake linkage proper; Fig. 3 is a face view of a nut forming part of said controlling device; Fig. 4 is a section on line 4—4 of Fig. 3; Fig. 5 is a cross section, upon an enlarged scale, of a valve operated by the accelerator pedal; Figs. 6 and 7 are longitudinal sections of the controlling device, substantially similar to Fig. 2, but showing the movable parts in different positions; Fig. 8 is a diagrammatic view illustrating the operation of my improved mechanism; Fig. 9 is a longitudinal section, upon an enlarged scale, of a part of the controlling device shown in Fig. 2, but the construction is somewhat different from this latter.

In Fig. 1, the frame or chassis is indicated at 1, one of the front wheels at 2, one of the rear wheels at 3, and their respective brake drums and brake shoes at 4 and 5. By means of intermediate elements or linkage 6, said brake shoes are connected with the actuating member, such as the customary brake pedal 7 fulcrumed at 8. The linkage 6 includes a special controlling device 9, illustrated in detail by Figs. 2, 6 and 7, and more fully described hereinafter.

At 10 I have indicated the usual accelerator pedal which by connections 11 controls the throttle valve of the carburetor 12 in the well-known manner. In my invention, the linkage or connections 11 also function to actuate a valve 13 which according to its position connects a pipe 14 leading from the device 9, either with the pipe 15 branched on the suction manifold 16 of the engine, or with the surrounding air, a filter 17 of the cartridge type or of any other suitable character being interposed in the connection from the air to the valve 13. The most suitable form of this valve is a three-way cock as shown in Fig. 5. In the position represented in this figure, the pipes 14 and 15 are connected together by means of the bore 32. By operating the accelerator pedal, the filter 17 will be connected to the pipe 14 by means of the bore 33 and the canal 33'. The rotatary movement caused by operating the pedal will then be communicated to the key 34 of this valve by means of the linkage 11 and the lever 13' shown on Fig. 1. Thus, when the accelerator pedal 10 is depressed to open the throttle, the valve 13 will connect the pipe 14 with the filter 17 and, through it, with the outside air, while when the said pedal is released (so as to resume its initial throttle-closing position under the influence of the customary spring, not shown) the valve 13 will automatically take the position in which it connects the pipe 14 with the suction manifold 16 through the pipe 15.

In detail, the controlling device 9 may be constructed as follows: A cylinder 18 containing a piston 19 is secured to one member of the brake linkage; for instance such cylinder may be screwed on the threaded end of a link 20, the other end of which is forked for pivotal connection at 21 with the brake pedal lever 7. The piston 19 is secured to another member of the brake linkage; for instance, the piston rod 22 may have a turnbuckle connection at 23 with an aligning rod 22' forming part of the brake linkage. At 24 I have indicated a nipple or other suitable member for connecting the interior of the cylinder 18 (on the side of the piston opposite to the piston rod 22) with the above-mentioned pipe 14.

The piston rod 22 is provided with special ridges 25 of sawtooth like or wedge-shaped cross section, the flat sides of said ridges facing outwardly, that is to say, toward that cylinder head through which the said rod extends. The drawings show the ridges 25 as formed by a continuous screw-thread. On the portion 25 of the rod 22 is fitted a sectional or divided holding member or nut 26, shown in detail in Figs. 3 and 4. In the particular form illustrated, the nut is made of three pieces or sections with radial adjoining end surfaces, and with peripheral grooves in which lies a suitable annular spring 27 tending to press said sections inwardly, but allowing them to move outwardly, or to spread apart, under conditions to be set forth presently. The nut 26 is movable lengthwise between two abutments or stops 28, 29 on the cylinder 18. The piston 19 and the rod 22 are movable lengthwise, not only to the same extent as the nut 26, but even farther, in the direction of the arrow 30, after the nut 26 has been stopped by engagement with the abutment 29. This further movement of the rod 22, while the nut 26 remains stationary, is possible on account of the divided construction of the nut and of the wedge-like formation of the screw threads on the nut and on the rod, which permits and causes the nut to expand upon such continued or independent movement of the piston rod, the nut acting very much after the fashion of a spring-pressed pawl and being contracted by its spring 27 every time the rod 22 advances relatively to the nut, by the distance or pitch between two adjoining turns of the thread, or between two adjoining ridges. It will readily be understood that it is not essential to my invention to have the ridges 25 in the nature of a screw thread, and the member 26 formed as a nut, although I prefer this construction on account of its easy manufacture.

Whenever the interior of the cylinder 18 is connected with the suction side of the engine, as explained above, the piston 19, rod 22, and nut or holding member 26 will move toward the end of the cylinder at which the nipple 24 is located, until the nut is stopped by the abutment 29, whereupon the piston and its rod will continue to move alone, the nut alternately expanding and contracting during such further movement of the piston and its rod 22.

If however the suction drawing the piston 19 into the cylinder 18 ceases and a mechanical pull is exerted on the device 9 in such a direction as to cause the piston rod 22 to move outwardly through the cylinder head, said piston will move in unison with the piston rod 22 and the holding member 26 until the latter engages the abutment 28. It will be understood that the formation of the engaging portions of the holding member 26 and the piston rod 22 is such as to allow their relative movement in one direction only, (rod 22 to move inwardly relatively to the member 26) and since the flat surfaces of the threads or serrations are forced against each other when the holding member 26 engages the abutment 28 during the outward movement of the piston rod 22, outward movement of said rod is impossible as soon as the holding member is stopped by the abutment 28. Therefore, when this position is reached (Figs. 2 and 7) the device 9 will form a rigid unit as regards any further pull exerted thereon; in other words, should a pull be exerted toward the right on the piston rod 22, or toward the left on the link 20, the piston and the cylinder will move in unison, as if a rigid rod were substituted for the link 20, the rod 22, and the cylinder 18 and piston 19 connecting them.

In order to prevent absolutely any further outward movement of the piston rod 22 from positions such as shown in Fig. 6, the chamber in which the holding member 26 moves is reduced in cross section at its outer end, as indicated at 31, being just large enough to allow a sliding fit for the holding member 26 but preventing any expansion of said member such as would permit the rod 22 to slip outwardly. Thus, no matter how strong a pull may be exerted when the parts are in positions such as shown in Fig. 6 (member 26 against the abutment 28), the member 26 will be held positively against expansion and will prevent any further outward movement of the piston rod 22. Therefore the holding member 26 can expand (to permit independent inward movement of the piston rod 22) only when said member engages the abutment 29 and lies in the enlarged portion 31' of the chamber located between the abutments 28 and 29, said enlargement being of sufficient width or diameter to allow the member 26 to expand far enough for the piston rod 22 to slide inwardly when suction is exerted on the piston 19 through the pipe 14.

Another preferred construction, in which the ridges are omitted, is shown in Fig. 9. In this construction the piston rod 22 carries in the opening 31' of the cylinder 18, an expansible holding member 35 which is made, by way of example, of three pieces or sections which are joined by the spring 27. These sections are conical towards their end 36 and can penetrate into a corresponding cone 37 of the cylinder 18. This partly conical holding member 35 with the piston rod 22 is displaceable towards the left, as far as the abutment 29, where the piston rod 22 continues its movement in sliding through the holding member. When the piston rod 22 is drawn towards the right, it will move in unison with the holding member 35, until the conical part 36 of the latter engages in the cone 37. Due to this engagement, the holding member 35 acts as a wedge between the piston rod 22 and the conical part of the cylinder 36 so that these two parts are secured together.

A small opening or duct 18' permits air to enter the cylinder 18 on the side of the piston rod 22 whenever the piston 19 moves toward the nipple 24, or to pass out when the piston moves in the opposite direction, and preferably a filter 18" is provided to prevent any dust or other foreign matter from entering the cylinder with such air.

The operation of the device illustrated by the drawings is as follows: Let us assume that the motor car is being driven at full speed; in this case the accelerator pedal 10 is depressed, the throttle of the carburetor 12 therefore being open and the valve 13 being in such a position as to connect the interior of the cylinder 18 with the outside air through the nipple 24, pipe 14 and filter 17. The brakes, of course, are released. Let us also assume that the shoes or linings of the brakes 4, 5 are pretty well worn. Now, if the car is to be stopped, the driver will (in the customary way) first release the accelerator pedal 10 and immediately thereafter shift his foot to depress the brake pedal 7. Release of the accelerator pedal 10 will move the throttle valve of the carburetor 12 toward the closed position, in the usual manner, but in addition to this customary function there will occur simultaneously a shifting of the valve 13 to the position in which it connects the pipe 14 with the pipe 15 and the suction manifold 16. The partial vacuum thus produced in the cylinder 18, toward the nipple 24, will cause the piston 19 to move in that direction (toward the left, in the drawings). The piston is made of such dimensions that its motion, under the influence of the suction just referred to, will exert on the piston rod 22 and the linkage 6 a pull just sufficient to shift the brake shoes into light engagement with the respective brake drums, without causing any appreciable braking action.

If, as we have assumed, the brakes are pretty well worn, the piston 19 will be moved, by suction, from the position shown in Fig. 2 to that shown in Fig. 6. That is to say, first the piston and its rod 22 will move in unison with the nut or holding member 26, until the latter engages the abutment 29; thereupon, while the member 26 remains stationary, the piston 19 and the rod 22 will continue to move toward the nipple 24, the member 26 alternately expanding and contracting, in the manner described above, as the rod 22 slides through it lengthwise. This movement will stop as soon as the brake shoes are just in light engagement with the brake drums. If there has been excessive wear of the brakes, the piston 19 will go practically to the limit of its travel, as indicated in Fig. 6, in order to bring the brake shoes into light contact with their brake drums; in the case of smaller wear, a smaller travel of the piston will suffice to produce the said result.

This bringing the brake shoes into light contact with their brake drums, by the movement of the piston 19 in response to the suction exerted thereon, occurs very quickly, so that the brake shoes reach said contact position by the time the driver depresses the brake pedal 7. This will shift the link 20 and cylinder 18 relatively to the piston 19 and holding member 26 until the latter engages the abutment 28; in other words, from a position such as shown in Fig. 6, the parts will be shifted to the position shown in Fig. 7. As soon as this condition is reached, the piston and the cylinder constitute a rigid unit, as regards the transmission of any longitudinal pull, so that further depression of the pedal 7 will press the brake shoes against their drums. It will be seen that the brake pedal has first performed an inactive or lost motion, the extent of which corresponds to the distance covered by the member 26 travelling from the abutment 29 towards the abutment 28, and immediately after such lost motion of constant extent, the pedal will apply the brakes effectively, irrespective of their condition of greater or less wear.

If the ridged holding member is replaced by the conical holding member as shown in Fig. 9, in releasing the accelerator pedal 10, the piston rod 22 will be displaced towards the left and in unison with this movement, a displacement of said holding member 35 will take place until the latter engages the abutment 29. Thereupon, while the member 35 remains stationary, the piston 19 and the rod 22 will continue to move through the holding member. This movement will stop, as described above, as soon as the brake shoes are just in light engagement with the brake drums.

Then by depressing the brake pedal 7, the driver will cause the link 20 and the cylinder 18 to be displaced relatively to the piston 19 and holding member 35 until the conical part 36 of the latter engages in the cone 37.

After the brake pedal has performed this inactive or lost motion, and due to this engagement which secures these two parts together, the pedal will apply the brakes effectively, irrespective of their condition of greater or less wear.

If, after applying the brakes as described, by using either one or the other of the holding members, the car is to be driven again, the driver releases the brake pedal 7 and again depresses the accelerator pedal 10. This again shifts the valve 13 to the position in which the pipe 14 is connected with the outside air. Simultaneously, the brake shoes have been moved away from their brake drums by the usual springs (not shown). But since there is a positive connection between the piston 19 and the brake shoes, the latter can move away from the respective drums only until the holding member 26 engages the abutment 29. The play of the holding member beween the two abutments is so dimensioned that when such member engages the abutment 28, the brake shoes will just be in light engagement with their drums, and when the member 26 engages the abutment 29, the brake shoes will be just lifted out of contact with the brake drums.

Whenever there is any wear on the brake shoes, the holding member 26 will therefore be shifted outwardly on the piston rod 22 (toward the right in the drawings), by the suction exerted within the cylinder 18 causing the piston 19 to be drawn inwardly (toward the left) until the brake shoes are in light engagement with their drums. As the wear increases, the piston will shift more and more toward the left and the member 26, being stopped by the abutment 29, will shift to the same extent to the right on the piston rod 22. The result is that when the brakes are released, their distance from the respective drums will always be the same, whether the brake shoes be new or worn. Thus the lost motion to be given to the brake lever 7 before it begins to apply the brakes, will be of constant extent.

If, in place of the holding member 26, the holding member 35 is used, exactly the same series of operations will take place as described above.

It will be seen that the purpose of the movable holding member 26 is to preserve a constant distance between the brake shoes and the brake drums, in the released position of the brakes, irrespective of their condition of wear, so that the beginning of the braking action will always take place at the same point of the throw of the brake lever 7. The purpose of the cylinder 18 is to shift the said member 26 outwardly (toward the right) on the piston rod 22, to an extent corresponding to the condition of wear of the brake shoes.

The novel conditions secured with my invention will be understood with especial clearness from Fig. 8, which is a diagram indicating the movement of the brake pedal 7. The pedal is shown in the normal or released position, corresponding to the point $a$ at one end of the arc $a, b, c, d$ representing the throw of the pedal. The portion $a, b$ of said arc is the inactive or lost motion of the pedal at the beginning of its depression, and, as explained above, this motion $a, b$ is of constant extent in a brake mechanism embodying my invention. The arc portion $b, c$ indicates the movement of the pedal during the actual application of the brakes, and the arc portion $c, d$ indicates an additional throw provided for the sake of safety. It will be noted—and this is a remarkable feature of my invention—that the braking action will always begin at $b$, however great may be the wear of the brake shoes, and this without requiring any adjustment of the linkage or other parts to be attended to, since the necessary adjustment is effected automatically by my invention.

With my invention, the distance $e$ between the fulcrum 8 and the pivotal connection 21 can readily be made much smaller than the corresponding distance in the case of a brake mechanism as ordinarily constructed. The reason for this difference is that with my invention, wear of the brake shoes does not affect the position of the point at which the application of the brakes begins. Thus a greater leverage and a correspondingly stronger braking action may be obtained when using my invention, and practical trials have shown that the customary leverage may be readily doubled if the brake mechanism embodies my invention.

It will be noted that the controlling device 9 will automatically adjust the linkage 6 to compensate for any wear of the brakes 4, 5, and particularly, such device will automatically shorten the linkage member formed by the link 20, cylinder 18, piston 19, and piston rod 22, in response to any wear of the brakes 4, 5.

When the brake shoes are completely worn, the holding member 26 has moved as far as it can towards the right relatively to the piston rod 22. When replacing the worn brake shoes by new ones, it would evidently be necessary to replace the holding member 26 in its original position (towards the left relatively to the piston rod 22). In order to make this adjustment, the right hand cap of the cylinder is unscrewed so as to render the member 26 accessible so that it can be expanded manually and the piston rod 22 moved towards the right as far as desired. If the ridges are given the form of a continuous screw-thread it would not be necessary to expand the holding member 26 which could be screwed along the piston rod 22.

Various modifications may be made without departing from the nature of my invention as set forth in the appended claims.

I claim:

1. A power-propelled vehicle provided with a brake mechanism comprising a brake and a movable member for actuating the same, linkage connecting said actuating member with said brake, said linkage including a controlling device which automatically adjusts said linkage to compensate for any wear of the brake, the said controlling device comprising two elements, viz. a cylinder and a piston, one of said elements being connected with the brake and the other with the brake-actuating member, a holding member co-operating with said elements to effect their relative adjustment, and a valve, operatively connected with the accelerator mechanism of the vehicle, to connect said cylinder with the suction side of the engine when the accelerator mechanism is inactive.

2. A power-propelled vehicle according to claim 1, in which the valve connects the cylinder with the outside air whenever the accelerator mechanism is in action.

3. A power-propelled vehicle according to claim 1, in which the valve connects the cylinder, on one side of the piston, with the outside air when the accelerator mechanism is in action, and in which a filter connects the cylinder, on the other side of the piston, permanently with the outside air.

4. A power-propelled vehicle according to claim 1, in which the valve connects the cylinder with the outside air whenever the accelerator mechanism is in action, and in which a filter is located in said valve-controlled connection of the cylinder to the outside air.

5. The combination, with a brake and a movable member for actuating same, of linkage connecting said actuating member with said brake, said linkage including a controlling device which comprises two members movable lengthwise relatively to each other, one of said two members being connected with the brake, and the other with the brake-actuating member, and a holding member movable lengthwise in both directions relatively to one of the said two linkage members, but only in one direction relatively to the other of said two members.

6. The combination, with a brake and a movable member for actuating same, of linkage connecting said actuating member with said brake, said linkage including a controlling device which comprises two members movable lengthwise relatively to each other, one of said two members being connected with the brake, and the other with the brake-actuating member, and a holding member having a limited longitudinal movement in both directions relatively to one of said two linkage members but movable only in one direction lengthwise of the other of said two members.

7. A brake mechanism according to claim 5, in which the holding member and one of said two linkage members are provided with interlocking formations permitting the holding member to slide lengthwise of said linkage member in one direction only and in which the holding member consists of sections movable toward and from each other to expand or contract such member, and a spring is provided tending to move such sections toward each other, that one of said two linkage members which does not interlock with the holding member, being provided with abutments between which said holding member is located to limit its longitudinal movement and to permit the expansion of said holding member when brought against one of said abutments.

8. A brake mechanism according to claim 5, in which the holding member and one of said two linkage members are provided with interlocking formations permitting the holding member to slide lengthwise of said linkage member in one direction only and in which the holding member consists of sections movable toward and from each other to expand or contract such member, and a spring is provided tending to move such sections toward each other, that one of said two linkage members which does not interlock with the holding member, being provided with abutments between which said holding member is located to limit the longitudinal movement and to permit the expansion of said holding member when brought against one of said abutments, the said linkage member being provided, adjacent to the other abutment, with surfaces preventing the expansion of the holding member when in engagement with such other abutment.

9. A brake mechanism according to claim 5, in which the holding member consists of sections movable toward and from each other to expand or contract such member, one end of this member being conical to fit into a conical opening on the linkage member not carrying said holding member and a spring tending to move the sections of the holding member towards each other.

10. A brake mechanism according to claim 5, in which the holding member consists of sections movable toward and from each other to expand or contract such member, and means for limiting the longitudinal movement of said holding member in both directions relatively to one of said two linkage members.

11. A brake mechanism according to claim 5, in which the holding member consists of sections movable toward and from each other to expand or contract such member, one end of this member being conical, and a spring tending to move the sections towards each other, the linkage member not carrying the said holding member being provided with an abutment and a conical opening between which said holding member is located to limit its longitudinal movement and to cause the contraction of said holding member when the latter fits into the conical opening.

EUGÈNE DELAY.